Patented July 1, 1930

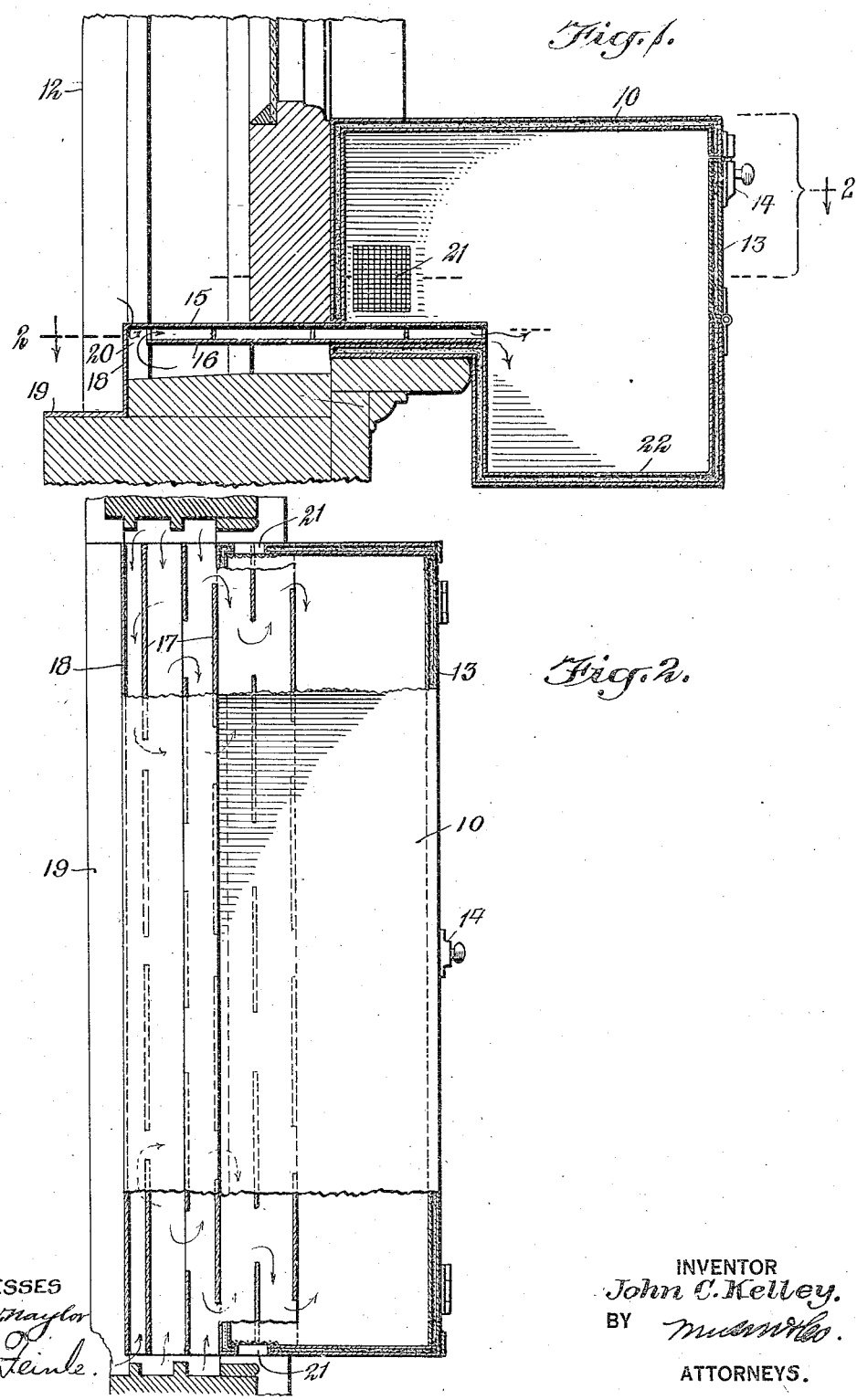

1,769,740

UNITED STATES PATENT OFFICE

JOHN CHAS. KELLEY, OF NEW YORK, N. Y.

WINDOW BOX

Application filed May 7, 1929. Serial No. 361,091.

This invention relates to a window box, otherwise known as a window refrigerator, suitable for preserving victuals or provisions in cold weather.

The principal object of the invention is the provision of a window box which may be easily adjusted to the sill of a window, which does not interfere with the opening and closing of the window, which provides for a circulation of fresh air while excluding dust, and which presents cold interior surfaces in the box by conduction of coldness from the exterior for the purpose of preserving victuals or provisions.

The nature of the invention and its distinguishing features and advantages will appear when the following specification is read in connection with the accompanying drawing, in which—

Figure 1 is a vertical sectional view of the box constructed in accordance with the invention shown applied to the sill of a window frame together with the lower sash thereof, portions of which are shown.

Fig. 2 is a sectional plan view, the sections being taken on the several lines 2—2 of Fig. 1.

Referring now more particularly to the drawings, it will be apparent that there is shown a box 10 so formed as to fit the interior portion of a sill 11 of a window frame 12, said box being secured to said sill in any preferred manner. The box 10 is of double wall construction with suitable insulating material, such as asbestos, mineral wool or any other preferred material, packed between the walls of the box. The box 10 has an inside hinged door 13 held in closed position by a suitable latch 14. The box 10 is provided with means for admitting air into the box from the outside, and also for conducting coldness, to the interior surfaces of the box, for the purpose of preserving victuals or provisions arranged in the box. The said means consists of plate members 15 and 16 which are connected together in superposed and spaced relationship by baffles 17 arranged in staggered relationship. The plate member 15 has integral and relatively angularly disposed flanges 18 and 19 which fit the outside portion of the sill 11. The plate members 15 and 16 project into the box through an opening therein, so as to form contact with the inner wall of the box. The plate members 15 and 16 are shorter in length than the width of the window frame opening, so that air may enter the box by circulating between the plate members 15 and 16 from the opposite ends. The plate member 16 is of less width than the plate member 15 providing a space 20 between the outer edge of the plate 16 and the flange 18. It will be apparent that the plate member 16 is spaced a suitable distance above the outer portion of the sill, so that air may pass beneath the plate member 16, through the space 20 and between the plate members 15 and 16 into the box 10. The opposite ends of the box 10 have screened openings 21 which allow air to circulate through the box, thereby insuring a supply of fresh air at all times. The baffle 17 compels the air to circulate in circuitous paths, and effectually prevents dust from entering the box 10.

Attention is now called to the fact that the plate members 15 and 16 will be exposed to the cold outside atmospheric temperature, and will conduct coldness to the inside walls of the box 10. The victuals or provisions to be kept in a state of preservation may be placed on the portion of the plate member 15 projecting interiorly of the box, and also on the bottom 22 of the box. In this manner the victuals or provisions may be preserved. The victuals or provisions may be readily removed from the box by opening the door 13.

The box walls, also the plate members 15 and 16, and baffles 17 are made preferably of sheet metal. The plate members and baffles constitute a unitary structure adjustably associable with the box in order to be applied to various sills.

I claim:

1. A window refrigerator comprising a victual or provision box, and spaced upper and lower plate members projecting interiorly of said box and also exteriorly thereof, the upper plate member having integral flanges engageable with vertical and upper outer surfaces of the sill of a window frame, an edge of the lower plate member being spaced from said vertical flange on the upper plate member to allow air to pass between said plate members into said box.

2. A window refrigerator comprising a victual or provision box, spaced upper and lower plate members projecting interiorly of said box in contact with certain walls thereof, and also projecting exteriorly of said box, the upper plate member having integral flanges engageable with vertical and upper surfaces of the sill of a window frame, and baffles interposing the plate members, an edge of the lower plate member being spaced from the vertical flange on the upper plate member to allow air to pass between said plate members into said box.

Signed at New York in the county of New York and State of New York this 4th day of May, A. D. 1929.

JOHN CHAS. KELLEY.